US012625372B2

(12) United States Patent
Summerville et al.

(10) Patent No.: US 12,625,372 B2
(45) Date of Patent: May 12, 2026

(54) AUTOMATICALLY MAGNIFYING REAL-WORLD CONTENT DISPLAYED ON A DIGITAL HEADSET OPERATING IN PASSTHROUGH MODE

(71) Applicant: Lenovo (Singapore) Pte. Ltd., New Tech Park (SG)

(72) Inventors: Mark K. Summerville, Apex, NC (US); Thomas E. Annunziata, Raleigh, NC (US); Fang Feng, Cary, NC (US); Timothy Richard Scott, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/591,503

(22) Filed: Feb. 29, 2024

(65) Prior Publication Data

US 2025/0277976 A1 Sep. 4, 2025

(51) Int. Cl.
*G02B 27/01* (2006.01)
*G06T 19/00* (2011.01)

(52) U.S. Cl.
CPC ........ *G02B 27/0172* (2013.01); *G06T 19/006* (2013.01); *G02B 2027/0134* (2013.01); *G02B 2027/0138* (2013.01); *G02B 2027/0178* (2013.01)

(58) Field of Classification Search
CPC ........ G02B 27/0172; G02B 2027/0134; G02B 2027/0138; G02B 2027/0178; G06T 19/006
See application file for complete search history.

(56) References Cited

U.S. PATENT DOCUMENTS

| | | | | |
|---|---|---|---|---|
| 11,461,936 B2 * | 10/2022 | Freeman | ................. | G06F 3/017 |
| 2011/0213664 A1 * | 9/2011 | Osterhout | .............. | G06F 3/013 |
| | | | | 705/14.58 |
| 2014/0287806 A1 * | 9/2014 | Balachandreswaran | ..................... | |
| | | | | A63F 13/285 |
| | | | | 463/7 |
| 2021/0375050 A1 * | 12/2021 | Gruen | .................... | G02B 5/005 |
| 2022/0101593 A1 * | 3/2022 | Rockel | ................. | A63F 13/655 |
| 2023/0005224 A1 * | 1/2023 | Cudak | .................... | G10L 15/22 |
| 2024/0103615 A1 * | 3/2024 | Huergo Wagner | ..... | G06F 3/012 |

(Continued)

FOREIGN PATENT DOCUMENTS

| | | | | | |
|---|---|---|---|---|---|
| EP | 3869391 A1 | * | 8/2021 | ........ | G06K 9/00268 |
| JP | 2013521576 A | * | 6/2013 | | |

*Primary Examiner* — Ricardo Osorio

(74) *Attorney, Agent, or Firm* — Kunzler Needham & Hilton

(57) ABSTRACT

Apparatus, methods, and computer program products that automatically magnify real-world content by digital glasses operating in passthrough mode are disclosed. One apparatus includes a processor and a memory. The memory includes instructions executable by the processor to cause the apparatus to detect one or more visual cues on a display of a digital headset operating in a passthrough mode and displaying real-world content of an environment surrounding the digital headset and automatically magnify at least a portion of the real-world content displayed on the display in response to detecting the one or more visual cues. Methods and computer program products that include and/or perform the operations and/or functions of the apparatus are also disclosed.

20 Claims, 12 Drawing Sheets

(56) References Cited

U.S. PATENT DOCUMENTS

| | | | |
|---|---|---|---|
| 2024/0153205 A1* | 5/2024 | Huergo Wagner | ..... G06T 17/00 |
| 2024/0406368 A1* | 12/2024 | Lemay | ................. H04N 13/296 |
| 2024/0411421 A1* | 12/2024 | Pastrana Vicente | .... G06F 3/011 |
| 2025/0111471 A1* | 4/2025 | Nattinger | ................ G06F 3/013 |

* cited by examiner

1000A

1000B

1100A

1100B

1200A

1200B

AUTOMATICALLY MAGNIFYING REAL-WORLD CONTENT DISPLAYED ON A DIGITAL HEADSET OPERATING IN PASSTHROUGH MODE

FIELD

The subject matter disclosed herein relates to digital headsets and, more particularly, relates to automatically magnifying real-world content displayed on a digital headset operating in passthrough mode.

DESCRIPTION OF THE RELATED ART

When a user is unable to read and/or discern real-world content while operating contemporary digital headsets (e.g., virtual reality (VR) glasses, VR goggles, augmented reality (AR) glasses, AR goggles, etc.) in passthrough mode, to read the real-world content, the user has to remove the digital headset and put on traditional/reading glasses so that the user is able to read, view, and/or interact with the real-world content. If the user subsequently wants to resume using the digital headset, the user has to remove the traditional/reading glasses and again put on the digital headset to resume use of the digital headset. As such, contemporary digital headset are not as user friendly as they otherwise could be.

BRIEF SUMMARY

Apparatus that can automatically magnify real-world content displayed on a digital headset operating in passthrough mode are disclosed. One apparatus includes a processor and a memory coupled to the processor. The memory includes instructions executable by the processor to cause the apparatus to detect one or more cues on a display of a digital headset operating in a passthrough mode and displaying real-world content of an environment surrounding the digital headset and automatically magnify at least a portion of the real-world content displayed on the display in response to detecting the one or more visual cues.

Also disclosed are methods that can automatically magnify real-world content displayed on a digital headset operating in passthrough mode. One method includes detecting, by a processor, one or more visual cues on a display of a digital headset operating in a passthrough mode and displaying real-world content of an environment surrounding the digital headset and, in response to detecting the one or more cues, automatically magnifying at least a portion of the real-world content displayed on the display.

Further disclosed herein are computer program products including a computer-readable storage device including code embodied therewith that can automatically magnify real-world content displayed on a digital headset operating in passthrough mode. The code is executable by a processor and causes the processor to detect one or more cues on a display of a digital headset operating in a passthrough mode and displaying real-world content of an environment surrounding the digital headset and automatically magnify at least a portion of the real-world content displayed on the display in response to detecting the one or more visual cues.

BRIEF DESCRIPTION OF THE DRAWINGS

A more particular description of the embodiments briefly described above will be rendered by reference to specific embodiments that are illustrated in the appended drawings.

Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
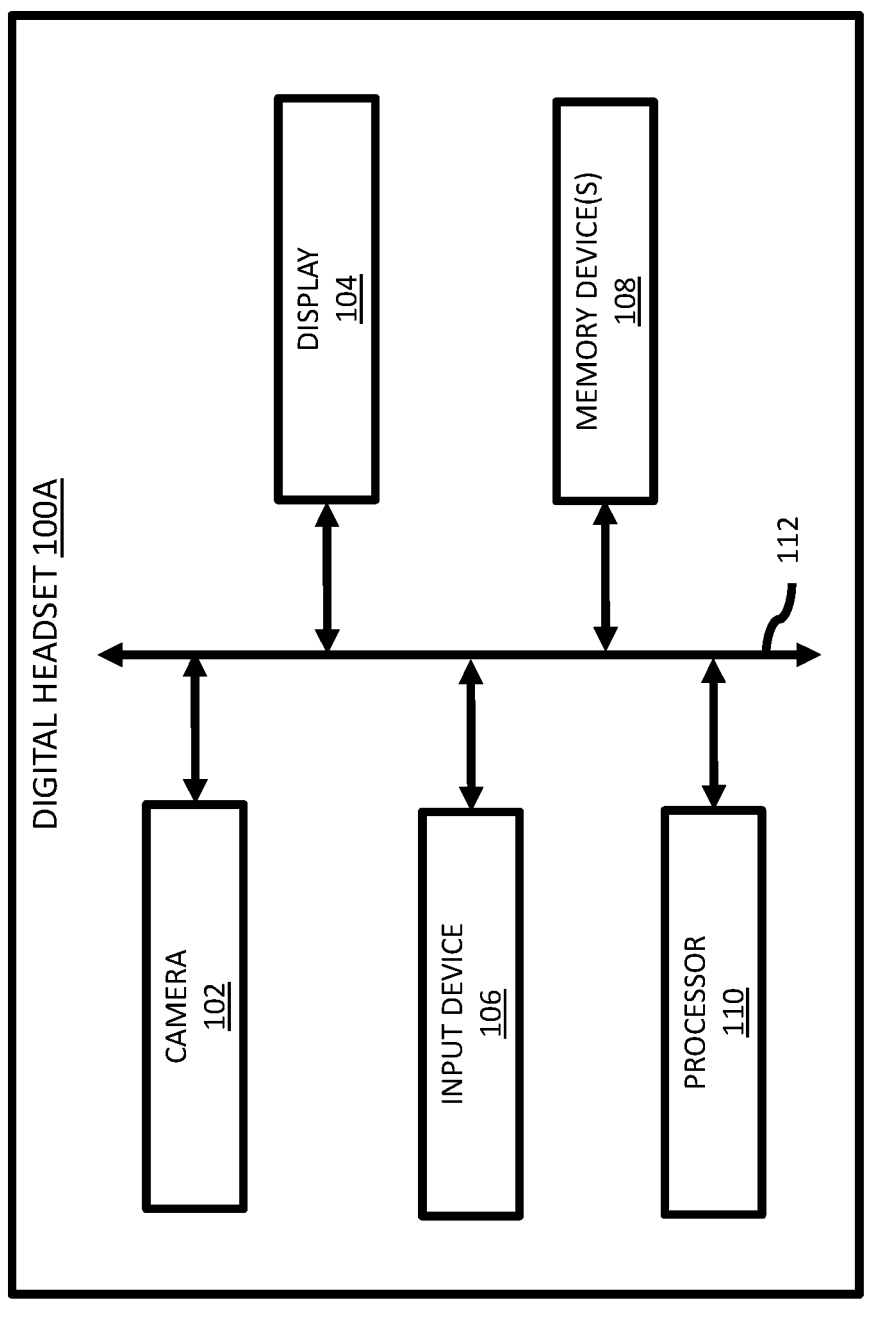
FIGS. 1A and 1B are schematic block diagrams of various embodiments of a digital headset.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a circuit, module, or system. Furthermore, embodiments may take the form of a program product embodied in one or more computer-readable storage devices storing machine readable code, computer-readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together and may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer-readable storage devices. Where a module or portions of a module are implemented in software, the software portions are stored on one or more computer-readable storage devices.

Any combination of one or more computer-readable media may be utilized. The computer-readable medium/media may include one or more computer-readable storage media. The computer-readable storage medium/media may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (e.g., a non-exhaustive and/or non-limiting list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the C programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to one embodiment, an embodiment, or similar language means that a particular feature, structure, or characteristic described in connection with the embodiment is included in at least one embodiment. Thus, appearances of the phrases in one embodiment, in an embodiment, and similar language throughout this specification may, but do not necessarily, all refer to the same embodiment, but mean one or more but not all embodiments unless expressly specified otherwise. The terms including, comprising, having, and variations thereof mean including but not limited to, unless expressly specified otherwise. An enumerated listing of items does not imply that any or all of the items are mutually exclusive, unless expressly specified otherwise. The terms, "a," "an," and "the," also refer to one or more unless expressly specified otherwise.

In addition, as used herein, the term, "set," can mean one or more, unless expressly specified otherwise. The term, "sets," can mean multiples of or a plurality of one or mores, ones or more, and/or ones or mores consistent with set theory, unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatus, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

With reference to FIG. 1A, FIG. 1A is a block diagram of one embodiment of a digital headset 100A. At least in the illustrated embodiment, the digital headset 100A includes, among other components, a camera 102, a display 104, an input device 106, a set of one or more memory devices 108, and a processor 110 coupled to and/or in communication with one another via a bus 112 (e.g., a wired and/or wireless bus).

A camera 102 may include any suitable device that is known or developed in the future capable of capturing real-world content in the environment surrounding the digital headset 100A and/or camera 102 and transmitting images, video feeds, and/or video streams of the real-world content in the environment surrounding the digital headset 100A and/or camera 102 to the display 104. In various embodiments, the camera 102 includes at least one video camera. In additional or alternative embodiments, the camera 102 includes an external facing camera.

Real-world content can include, but is not limited to, any suitable object(s), thing(s), item(s), article(s), substance(s), matter, information, data, and/or content that can exist and/or be found in a real-world environment surrounding the camera 102 and that can be visually detected by the camera 102. In various embodiments, the real-world content includes analog objects and/or digital objects. The analog object(s) and/or digital object(s) may include any suitable set of one or more analog objects and/or a set of one or more digital objects that can reside in a real-world environment.

In various embodiments, the real-world environment can include one or more analog objects that can serve as one or more visual cues for the digital headset 100A, as discussed elsewhere herein. In additional or alternative embodiments, the real-world environment can include one or more digital objects that can serve as one or more visual cues for the digital headset 100A, as further discussed elsewhere herein.

A display 104 may include any suitable device that is known or developed in the future capable of displaying the images, video feeds, and/or video streams. In certain embodiments, the display 104 includes an internal display of the digital headset 100A.

In various embodiments, the display 104 is configured to display the real-world content in the environment surrounding the digital headset 100A and/or camera 102 captured by the camera 102. That is, the display 104 is configured to display the analog object(s) and/or digital object(s) captured by the camera 102, which can be any of the analog objects and/or digital objects discussed elsewhere herein.

An input device 106 may include any suitable device that is known or developed in the future capable of receiving one or more user inputs. In various embodiments, the input device 106 includes a button and/or a microphone, etc., among other suitable input devices that are possible, each of which is contemplated herein.

A set of memory devices 108 may include any suitable quantity of memory devices 108. Further, a memory device 108 may include any suitable type of device and/or system that is known or developed in the future that can store computer-useable and/or computer-readable code. In various embodiments, a memory device 108 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., a processor 110A).

A memory device 108, in some embodiments, includes volatile computer storage media. For example, a memory device 108 may include random access memory (RAM), including dynamic RAM (DRAM), synchronous dynamic RAM (SDRAM), and/or static RAM (SRAM). In other embodiments, a memory device 108 includes non-volatile computer storage media. For example, a memory device 108 may include a hard disk drive, a flash memory, and/or any other suitable non-volatile computer storage device that is known or developed in the future. In various embodiments, a memory device 108 includes both volatile and non-volatile computer storage media.

Figure 2:
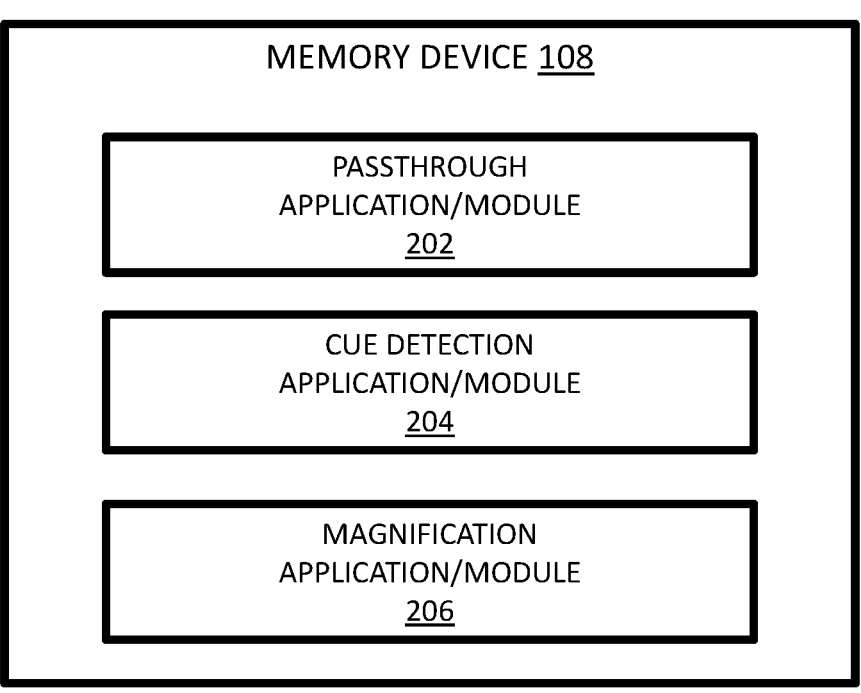
FIG. 2 is schematic block diagram of one embodiment of a memory device included in the digital headsets of FIGS. 1A and 1B.

With reference now to FIG. 2, FIG. 2 is a schematic block diagram of one embodiment of a memory device 108. At least in the illustrated embodiment, the memory device 108 includes, among other components, a passthrough application and/or module 202, a cue detection application and/or module 204, and a magnification application and/or module 206 that are each configured to operate/function when executed by the processor 110.

A passthrough application/module 202 may include any suitable hardware and/or software that can, in real-time, capture and display the real-world environment surrounding the digital headset 100A and/or camera 102 captured by the camera 102 to a user. In various embodiments, the passthrough application/module 202 is configured to utilize the camera 102 to capture one or more images of the real-world environment surrounding the digital headset 100A and/or camera 102 in real-time and generate a video feed and/or video stream that includes the captured image(s) of the real-world environment. The video feed and/or video stream that includes the captured image(s) includes one or more analog objects and/or one or more digital objects present in the real-world environment surrounding the digital headset 100A and/or camera 102, as discussed elsewhere herein.

The passthrough application/module 202, in various embodiments, is further configured to transmit the video feed and/or video stream to the display 104 for display on the display 104. Further, the passthrough application/module 202 is configured to utilize the display 104 to display the analog object(s) and/or digital object(s) captured in real-time included in the real-world environment surrounding the digital headset 100A and/or camera 102 to a user.

The passthrough application/module 202, in various embodiments, is configured to transmit the video feed and/or video stream to the cue detection application/module 204. Further, the cue detection application/module 204 is config- ured to receive the video feed and/or video stream from the passthrough application/module 202.

A cue detection application/module 204 may include any suitable hardware and/or software that can detect and/or identify one or more cues. A cue may be any suitable cue(s) that is/are known or developed in the future.

In certain embodiments, a cue includes a visual cue. The visual cue, in various embodiments, may be set by a manu- facturer and/or by a user of the digital headset 100A.

A visual cue, in some embodiments, includes a predeter- mined visual cue. The predetermined visual cue may include any suitable set of one or more visual cues that is/are known or developed in the future. Example visual cues can include, but are not limited to, a shape, a color, a light, a glow, a frequency, a magnitude, a texture, motion (e.g., movement, static, etc.), a size/scale, a dimension (e.g., length, width, height, depth, thickness, etc.), a symbol, a number, a letter, a word, a contrast, an icon, a gesture, and/or an orientation of such, etc., among other visual cues that are possible, each of which are contemplated herein.

In various embodiments, a user of the digital headset 100A can trigger and/or cause the predetermined visual cue to appear, come into view, and/or be displayed on the display 104 such that the cue detection application/module 204 is able to detect and/or identify the predetermined visual cue thereon. The predetermined visual cue can be caused to appear, come into view, and/or be displayed on the display 104 using any suitable technology, method, and/or technique that is known or developed in the future.

In certain embodiments, the predetermined visual cue can be caused to appear, come into view, and/or be displayed on the display 104 by bringing the predetermined visual cue into view on the display from the bottom of a screen, the top of the screen, a left side of the screen, or the right side of the screen of the display 104, among other methods and/or techniques that are possible, each of which is contemplated herein. For example, the user can look up, down, left, or right (e.g., in an exaggerated manner, a visually reaching manner, and/or other predetermined manner) to trigger dis- play of the predetermined visual cue on a screen of the display 104 and/or so that the predetermined visual cue appears on the screen in response thereto.

In other non-limiting examples, the predetermined visual cue can be caused to appear, come into view, and/or be displayed on the display 104 in response to the user tilting their head in a predetermined manner. That is, the user can tilt there head up, down, left, or right (e.g., in an exaggerated manner and/or other predetermined manner) to trigger dis- play of the predetermined visual cue on the screen of the display 104 and/or so that the predetermined visual cue appears on the screen in response thereto.

In still other non-limiting examples, the predetermined visual cue can be externally caused to appear, come into view, and/or be displayed on the display 104 in response to the user manually presenting the predetermined visual cue within the field of view of the digital headset 100A operating in the passthrough mode. That is, the user can present the predetermined visual cue within the field of view of the camera 102, which can cause the predetermined visual cue to be displayed on the screen of the display 104 and/or so that the predetermined visual cue appears on the screen in response thereto.

While multiple examples of technologies, techniques, and/or methods for causing a predetermined visual cue to appear, come into view, and/or be displayed on the display 104 are presented above, the various embodiments are not limited by these examples. Rather, these examples are provided to assist in understanding the nature and principles of the various embodiments. As such, the nature and prin- ciples of the above examples can be applied by one skilled in the art beyond the specific examples provided herein in extrapolating the extent and/or scope of the various embodi- ments disclosed herein.

In some additional or alternative embodiments, a visual cue can be automatically (e.g., without user input) and/or automatedly (e.g., without user interaction) detected and/or identified by the cue detection application/module 204. In certain embodiments, one or more visual cues may be assigned to and/or associated with one or more real-world objects and the cue detection application/module 204 is configured to detect and/or identify the visual cue(s) in the video feed and/or video stream of the real-world environ- ment surrounding the digital headset 100A and/or the cam- era 102 captured in real-time by the camera 102.

The visual cue(s) in the video feed and/or video stream of the real-world environment surrounding the digital headset 100A and/or the camera 102 captured in real-time by the camera 102 that are automatically/automatedly detected and/or identified by the cue detection application/module 204 may include any suitable real-world object(s) that are known or developed in the future. That is, the visual cue(s) may include any suitable analog object(s) and/or digital object(s) that can be found and/or may be found in of a real-world environment within which the digital headset 100A and/or camera 102 may reside. Here, the analog object(s) and/or digital object(s) may be considered and/or referred to as at least a portion of the real-world content captured in real-time by the camera 102.

In some embodiments, a visual cue can include an analog visual cue. Example analog visual cues that can be associ- ated with and/or assigned as a visual cue may include, but are not limited to, analog printed material, analog data, analog information, analog text, analog images, and/or ana- log video, etc., among other types of analog objects, analog things, analog items, analog articles, analog substances, analog matter, analog information, analog data, and/or ana- log content that are possible, each of which is contemplated herein.

In additional or alternative embodiments, a visual cue can include an analog object. Example analog objects can include, but are not limited to, a book, a magazine, a label, a sign, a piece of paper, an analog watch/clock, an analog video/movie, and/or a picture, among other printed material that is capable of being read and/or viewed in the real-world surrounding the camera 102.

In further additional or alternative embodiments, a visual cue can include a digital visual cue, which can include anything that may be displayed and/or can be displayed on a display and/or screen of a computing device. That is, a digital visual cue may include any digital information and/or digital data that can exist and/or be displayed on an electronic device, a computing device, a display, and/or a screen. Example digital visual cues may include, but are not limited to, digital material, digital data, digital information, digital text, digital images, and/or digital video, etc., among other types of digital material, digital objects, digital things, digital items, digital articles, digital substances, digital matter, digital information, digital data, and/or digital content that is capable of being read and/or viewed in the real-world surrounding the camera 102.

In still further additional or alternative embodiments, a visual cue can include a digital object, which can include anything that may display and/or can display digital data on a display and/or screen. In certain embodiments, a digital object can include a computing device that can display digital visual cue thereon. Example digital objects can include, but are not limited of, a display, a screen, a laptop computer, a desktop computer, a hand-held computer, a smart phone, a cellular telephone, a smart watch, smart television, a personal digital assistant (PDA), a digital book, a digital magazine, a digital label, a digital sign, a digital video/movie, and/or a digital picture, among other digital objects that can reside in the real-world surrounding the camera 102. Accordingly, the digital object(s) captured by the camera 102 can be any digital device and/or type of digital device that is known or developed in the future that can display digital data.

As discuss herein, a visual cue may include any suitable set of one or more or digital objects that can reside in the real-world environment surrounding the digital headset 100A and/or camera 102. In further embodiments, a visual cue can further include a digital visual cue displayed on and/or residing on a digital object. Examples of these types of digital visual cues can include, but are not limited to, a shape, a color, a light, a glow, a frequency, a magnitude, a texture, motion (e.g., movement, static, etc.), a size/scale, a dimension (e.g., length, width, height, depth, thickness, etc.), a symbol, a number, a letter, a word, a contrast, an icon, a gesture, and/or an orientation, etc., among other digital things and/or digital items that can reside and/or be found on a digital object residing in the real-world environment surrounding the digital headset 100A and/or camera 102 that are possible, each of which is contemplated herein.

For example, an object may be detected/identified by the cue detection application/module 204 as a display/screen of a computing device (e.g., cellular telephone, smart phone, laptop computer, smart watch, PDA, etc.) based on a shape, glow being emitted therefrom, multiple colors being detected thereon, and/or a glow being adjacent to a non-glowing border, etc., among other cue(s) that assist in identifying an object as a display/screen. Additionally, or alternatively, a digital visual cue may be detected/identified by the cue detection application/module 204 as digital data (e.g., text, image, video, etc.) based on glow, color, text, frequency, and/or size of the digital visual cue and/or the adjacency of such to an identified digital object.

In another non-limiting example, an analog object may be identified as a book based on the shape (e.g., a rectangle), a size, and/or a lack of glow of the analog object. Additionally, or alternatively, an analog visual cue may be detected/identified as analog data (e.g., text, image, etc.) based on the text itself, color, texture, shape, and/or size of the analog visual cue and/or the orientation of the analog visual cue to one or more detected/identified analog objects (e.g., a book, watch, clock, sign, etc.).

While multiple examples of identifying digital visual cues, digital objects, digital objects, and/or analog visual cues are presented above, the various embodiments are not limited by these examples. Rather, these examples are provided to assist in understanding the nature and principles of the various embodiments. As such, the nature and principles of the above examples can be applied by one skilled in the art beyond the specific examples provided herein in extrapolating the extent and/or scope of the various embodiments disclosed herein.

The cue detection application/module 204, in various embodiments, is configured to transmit the detected and/or identified visual cue(s) to the magnification application/module 206. Further, the magnification application/module 206 is configured to receive the visual cue(s) from the cue detection application/module 204.

A magnification application and/or module 206 may include any suitable hardware and/or software that can magnify a displayed object. In various embodiments, the magnification application/module 206 is configured to magnify at least a portion of real-world content displayed on the display 104 in response to receiving one or more visual cues received from the cue detection application/module 204.

The magnification application and/or module 206 may magnify the entire real-world content, the portion of the real-world content, the object(s), and/or data to any suitable magnification that is known or developed in the future. Example magnifications include, but are not limited to, 1.5× magnification, 2× magnification, 2.5× magnification, 3× magnification, 4× magnification, 5× magnification, and 10× magnification, etc., among other magnifications that are greater than 10× magnification or less than 1.5× magnification that are possible, each of which is contemplated herein.

In some embodiments, the amount and/or magnitude of magnification is a set amount. In additional or alternative embodiments, the amount/magnitude of magnification is adjustable by the user (e.g., via receiving a user input via input device 106). In further additional or alternative embodiments, the amount/magnitude of magnification is adjustable based on the type of real-world content and/or a size of the real-world content, which amount and/or magnitude of adjustment can be automatic, automated, and/or selected by the user (e.g., via receiving a user input via input device 106). In other additional or alternative embodiments, the amount and/or magnitude of magnification can be canceled and/or returned to its original size/magnitude in response to receiving a user input via input device 106.

In some embodiments, the magnification application/module 206 is configured to magnify one or more analog objects in response to the cue detection application/module 204 detecting/identifying the analog object(s). For example, the magnification application/module 206 is configured to magnify a flyer (e.g., a piece of paper) in response to the cue detection application/module 204 detecting/identifying the flyer, among other analog objects and/or types of analog objects that are possible, each of which is contemplated herein. Here, the flyer can be magnified 2.5× so that the user is able to view/read the flyer while wearing the digital headset 100A and/or without removing the headset 100A and putting on reading glasses to view/read the flyer.

While an example of magnifying an analog object is presented above, the various embodiments are not limited by this example. Rather, this example is provided to assist in understanding the nature and principles of the various embodiments. As such, the nature and principles of the above example can be applied by one skilled in the art beyond the specific example of a flyer in extrapolating the extent and/or scope of the various additional embodiments related to other analog objects and/or types of analog objects.

In additional or alternative embodiments, the magnification application/module 206 is configured to magnify analog data/materials in response to the cue detection application/module 204 detecting/identifying the analog data/materials. For example, the magnification application/module 206 is configured to magnify written text (e.g., letters, numbers, words, paragraphs, symbols, etc.) in response to the cue detection application/module 204 detecting/identifying the analog data/materials, among other analog data/materials and/or types of analog data/materials that are possible, each of which is contemplated herein. Here, the analog data/materials can be magnified 3× so that the user is able to view/read the analog data/materials while wearing the digital headset 100A and/or without removing the headset 100A and putting on reading glasses to view/read the analog data/materials.

While an example of magnifying analog data/materials is presented above, the various embodiments are not limited by this example. Rather, this example is provided to assist in understanding the nature and principles of the various embodiments. As such, the nature and principles of the above example can be applied by one skilled in the art beyond the specific example of analog data/materials in extrapolating the extent and/or scope of the various additional embodiments related to other analog data/materials and/or types of analog data/materials.

In further additional or alternative embodiments, the magnification application/module 206 is configured to magnify one or more digital objects in response to the cue detection application/module 204 detecting/identifying the digital object(s). For example, the magnification application/module 206 is configured to magnify a display/screen of a computing device that is external to the digital headset 100A in response to the cue detection application/module 204 detecting/identifying the display/screen and/or the computing device, among other digital objects and/or types of digital objects that are possible, each of which is contemplated herein. Here, the display/screen can be magnified 2× so that the user is able to view/read the display/screen and/or the contents of the display/screen while wearing the digital headset 100A and/or without removing the headset 100A and putting on reading glasses to view/read the display/screen and/or the contents of the display/screen.

While an example of magnifying a digital object is presented above, the various embodiments are not limited by this example. Rather, this example is provided to assist in understanding the nature and principles of the various embodiments. As such, the nature and principles of the above example can be applied by one skilled in the art beyond the specific example of a display/screen in extrapolating the extent and/or scope of the various additional embodiments related to other digital objects and/or types of digital objects.

In still further additional or alternative embodiments, the magnification application/module 206 is configured to magnify digital data/materials in response to the cue detection application/module 204 detecting/identifying the digital data/materials and/or one or more digital objects associated with the digital data/materials. For example, the magnification application/module 206 is configured to magnify at least a portion of the digital data (e.g., digital text) and/or digital materials (e.g., a digital image, digital video, etc.) displayed on a display/screen of a computing device that is external to the digital headset 100A in response to the cue detection application/module 204 detecting/identifying the digital data/materials, display/screen, and/or the computing device, among other digital data/materials and/or types of digital data/materials that are possible, each of which is contemplated herein. Here, the digital data/materials can be magnified 2.5× so that the user is able to view/read the portion(s) of the digital data/materials while wearing the digital headset 100A and/or without removing the headset 100A and putting on reading glasses to view/read the portion(s) of the digital data/materials.

While an example of magnifying digital data/materials is presented above, the various embodiments are not limited by this example. Rather, this example is provided to assist in understanding the nature and principles of the various embodiments. As such, the nature and principles of the above example can be applied by one skilled in the art beyond the specific example of digital data/materials in extrapolating the extent and/or scope of the various additional embodiments related to other digital data/materials and/or types of digital data/materials.

Referring back to FIG. 1A, a processor 110 may include any suitable non-volatile/persistent hardware and/or software configured to perform and/or facilitate performing various processing functions and/or operations. In various embodiments, the processor 110 includes hardware and/or software for executing instructions in a passthrough application and/or module 202, a cue detection application and/or module 204, and a magnification application and/or module 206 (see, e.g., FIG. 2). The passthrough application and/or module 202, cue detection application and/or module 204, and magnification application and/or module 206 executed by the processor 110 can be stored on and executed from a memory device 108 and/or from the processor 110.

Figure 3:
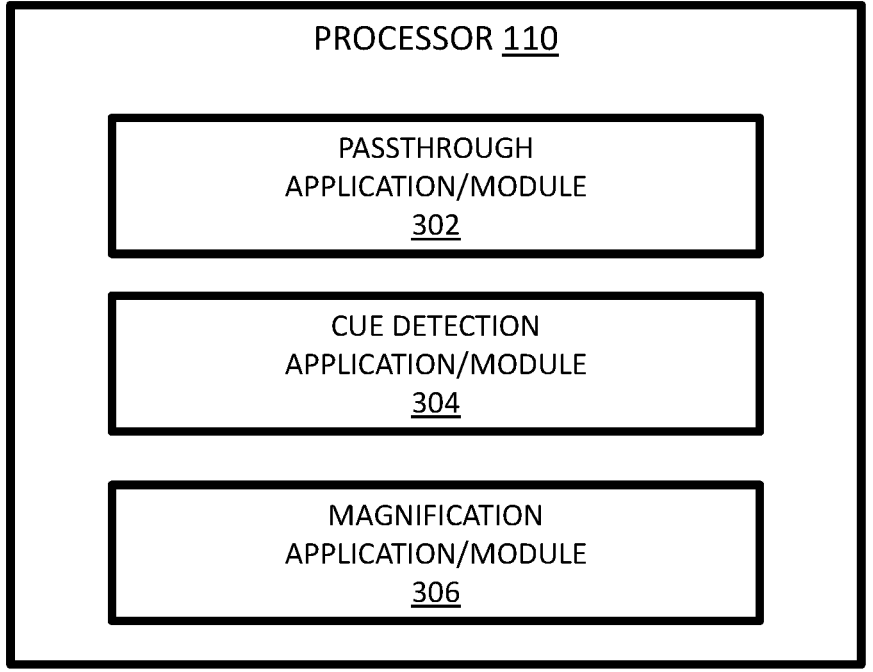
FIG. 3 is schematic block diagram of one embodiment of a processor included in the digital headsets of FIGS. 1A and 1B.

With reference to FIG. 3, FIG. 3 is a schematic block diagram of one embodiment of a processor 110. At least in the illustrated embodiment, the processor 110 includes, among other components, a passthrough application and/or module 302, a cue detection application and/or module 304, and a magnification application and/or module 306 similar to the passthrough application and/or module 202, a cue detection application and/or module 204, and a magnification application and/or module 206 stored on the storage device(s) 108 discussed with reference to FIG. 2. As such, the passthrough application and/or module 202/302, cue detection application and/or module 204/304, and magnification application and/or module 206/306 executed by the processor 110 can be stored on and executed from a memory device 108 and/or from the processor 110.

Figure 1B:
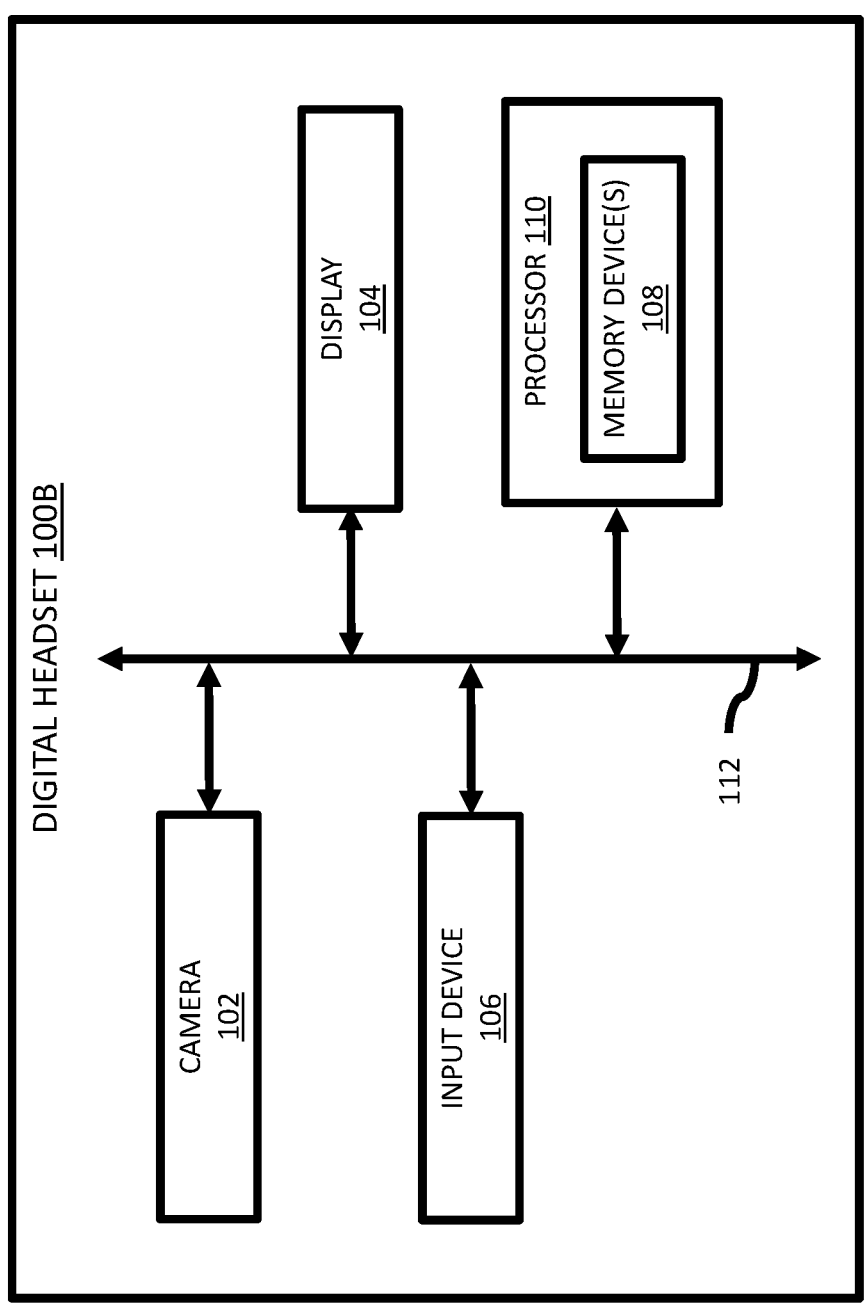

Referring to FIG. 1B, FIG. 1B is a block diagram of another embodiment of a digital headset 100B. The digital headset 100B includes, among other components, a camera 102, a display 104, one or more input devices 106, one or more memory devices 108, and a processor 110 coupled to and/or in communication with one another via a bus 112, similar to the camera 102, display 104, input device(s) 106, memory device(s) 108, processor 110, and bus 112 discussed with reference to the digital headset 100A illustrated in and discussed with reference to FIG. 1A. Alternative to the digital headset 100A, the processor 110 in the digital headset 100B includes the memory device(s) 108 as opposed to the memory device(s) 108 of the digital headset 100A being a different device than and/or independent of the processor 110.

Figure 4A:
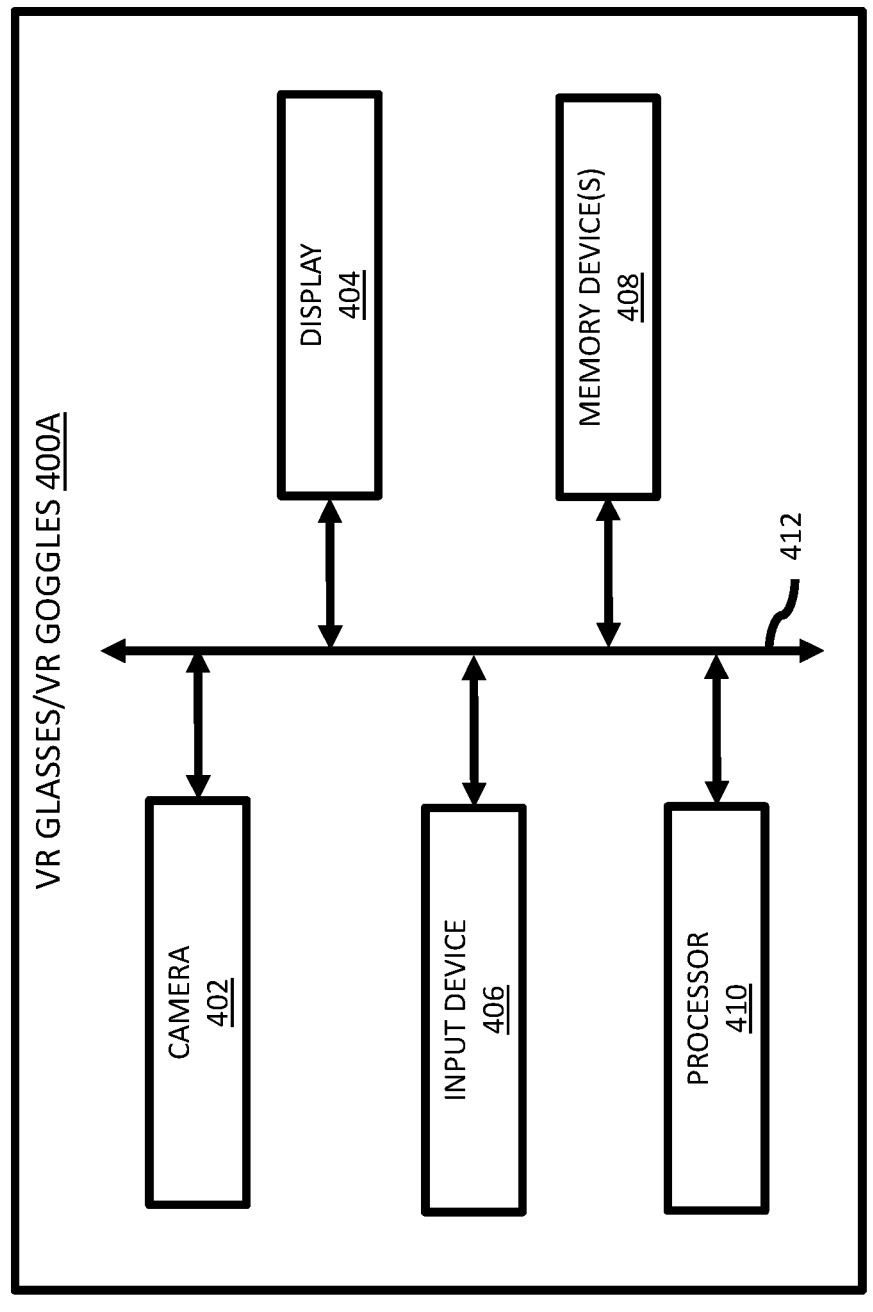
FIGS. 4A and 4B are schematic block diagrams of various embodiments of a set of virtual reality (VR) glasses and/or VR goggles.

With reference to FIG. 4A, FIG. 4A is a block diagram of one embodiment of virtual reality (VR) glasses and/or goggles 400A. The virtual reality glasses and/or goggles 400A include, among other components, a camera 402, a display 404, one or more input devices 406, one or more memory devices 408, and a processor 410 coupled to and/or in communication with one another via a bus 412, similar to the camera 102, display 104, input device(s) 106, memory device(s) 108, processor 110, and bus 112 discussed with reference to the digital headset 100A illustrated in and discussed with reference to FIG. 1A.

Figure 5:
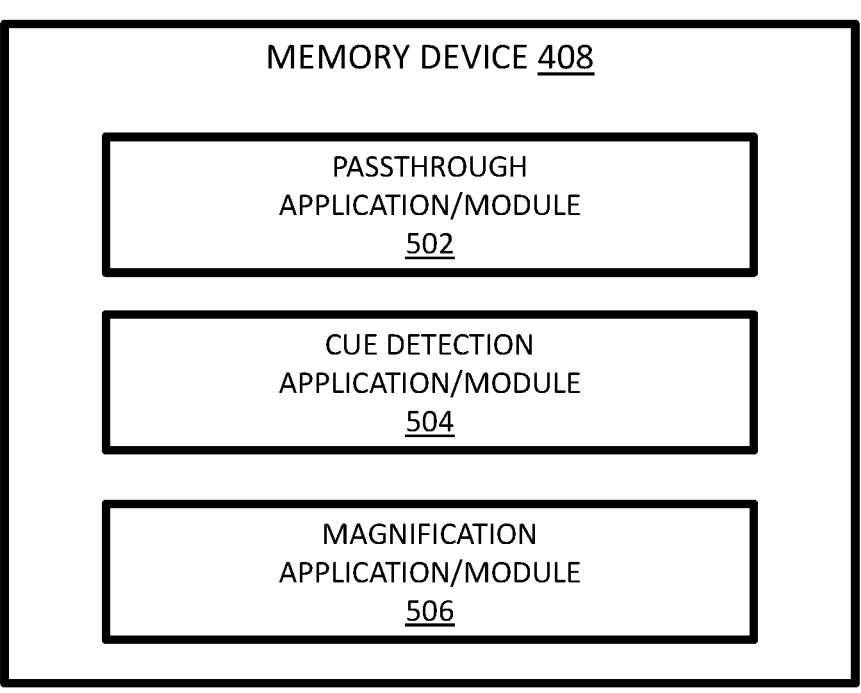
FIG. 5 is schematic block diagram of one embodiment of a memory device included in the VR glasses/VR goggles of FIGS. 4A and 4B.

Referring to FIG. 5, FIG. 5 is a schematic block diagram of one embodiment of a storage device 408. At least in the illustrated embodiment, the storage device 408 includes, among other components, a passthrough application and/or module 502, a cue detection application and/or module 504, and a magnification application and/or module 506 similar to the passthrough application and/or module 202, a cue detection application and/or module 204, and a magnification application and/or module 206 stored on the storage device(s) 108 discussed with reference to FIG. 2.

Figure 6:
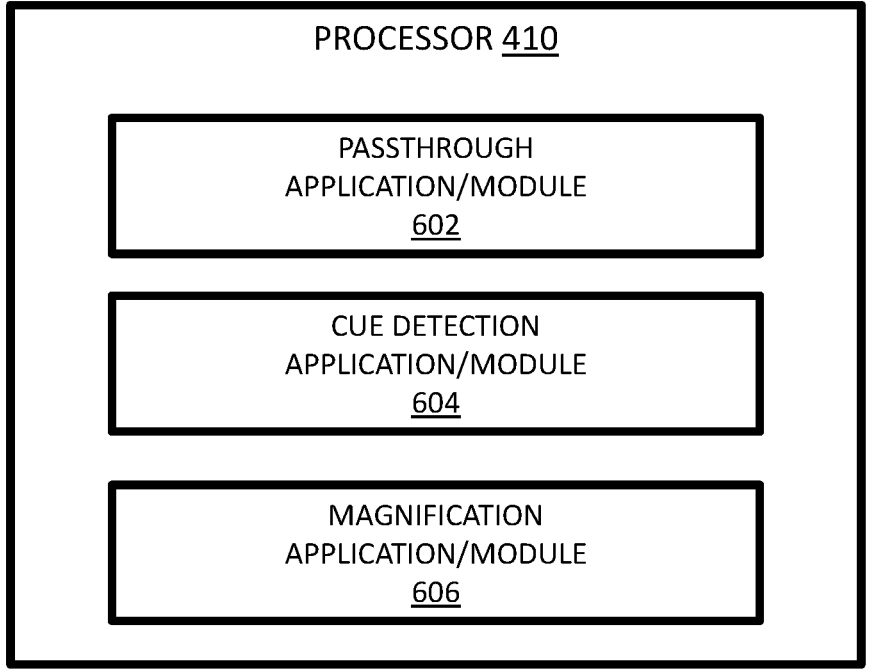
FIG. 6 is schematic block diagram of one embodiment of a processor included in the VR glasses/VR goggles of FIGS. 4A and 4B.

With reference to FIG. 6, FIG. 6 is a schematic block diagram of one embodiment of a processor 410. At least in the illustrated embodiment, the processor 410 includes, among other components, a passthrough application and/or module 602, a cue detection application and/or module 604, and a magnification application and/or module 606 similar to the passthrough application and/or module 302, a cue detection application and/or module 304, and a magnification application and/or module 306 stored on the processor 110 discussed with reference to FIG. 3. As such, the passthrough application and/or module 502/602, cue detection application and/or module 504/604, and magnification application and/or module 506/606 executed by the processor 410 can be stored on and executed from a memory device 408 and/or from the processor 410.

Figure 4B:
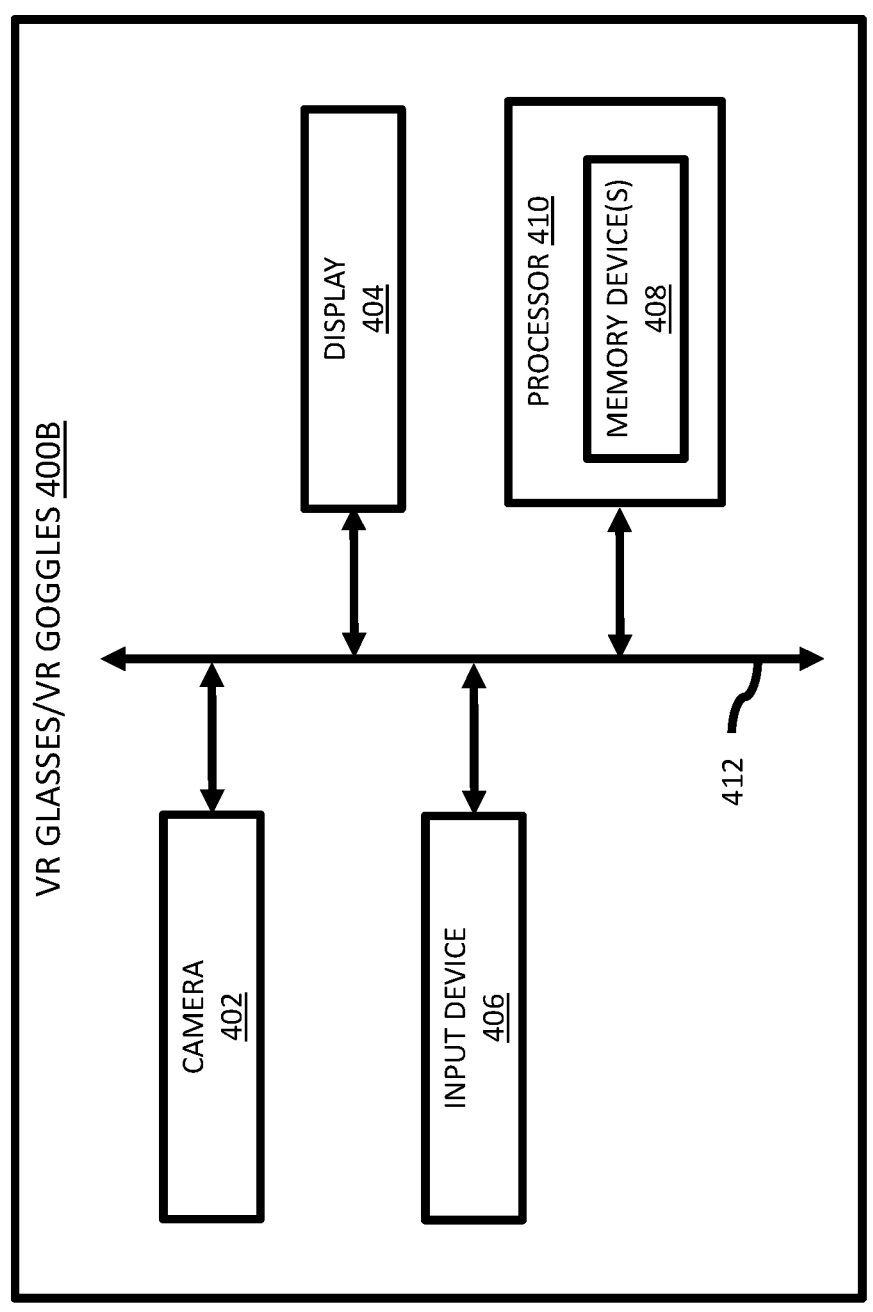

With reference to FIG. 4B, FIG. 4B is a block diagram of another embodiment of virtual reality glasses and/or goggles 400B. The virtual reality glasses and/or goggles 400B include, among other components, a camera 402, a display 404, one or more input devices 406, one or more memory devices 408, and a processor 410 coupled to and/or in communication with one another via a bus 412, similar to the camera 102, display 104, input device(s) 106, memory device(s) 108, processor 110, and bus 112 discussed with reference to the digital headset 100A illustrated in and discussed with reference to FIG. 1A. Alternative to the virtual reality glasses/goggles 400A, the processor 410 in the virtual reality glasses/goggles 400B includes the memory device(s) 408 as opposed to the memory device(s) 408 of the virtual reality glasses/goggles 400A being a different device than and/or independent of the processor 410.

Figure 7A:
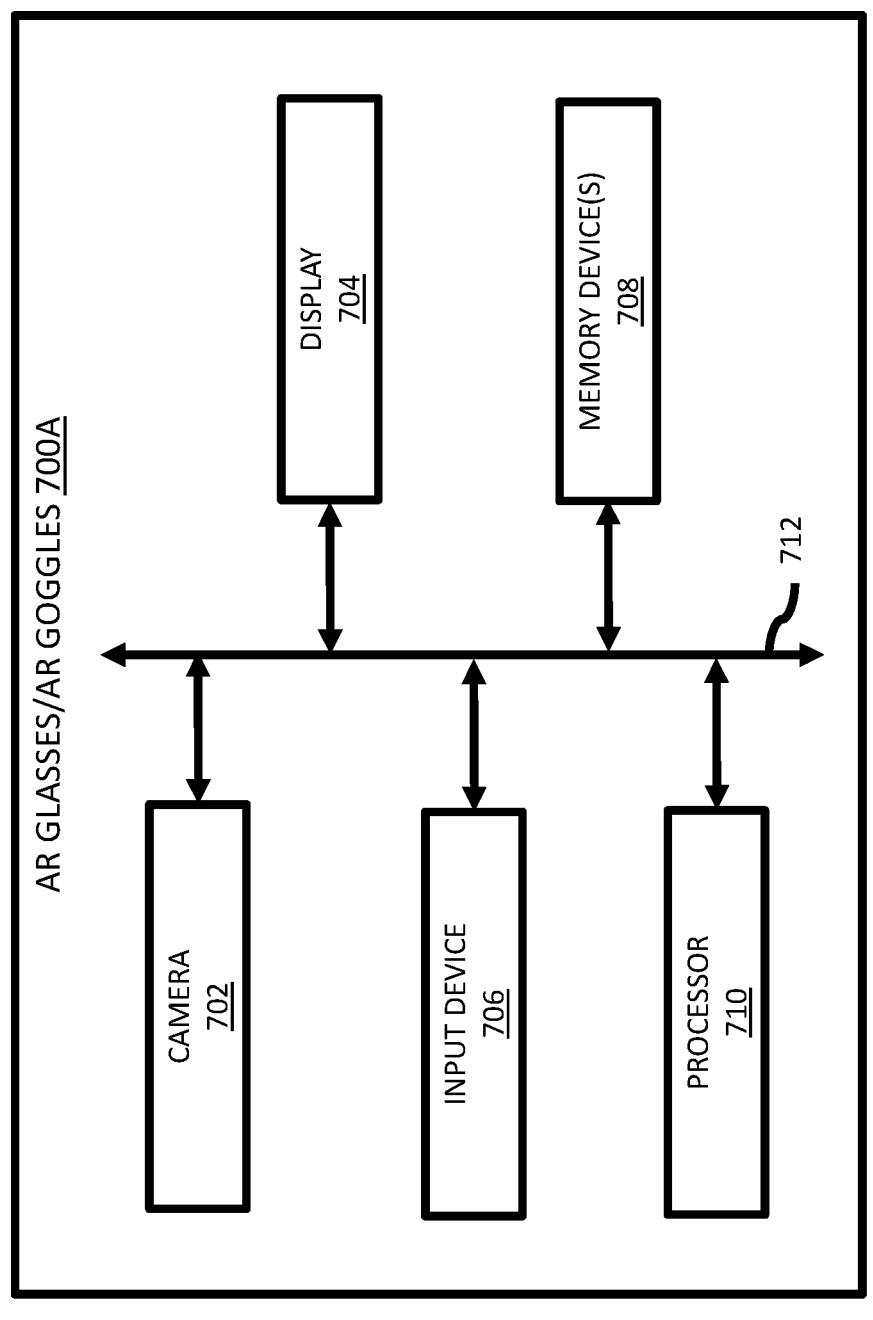
FIGS. 7A and 7B are schematic block diagrams of various embodiments of a set of augmented reality (AR) glasses and/or AR goggles.

Referring to FIG. 7A, FIG. 7A is a block diagram of one embodiment of augmented reality (AR) glasses and/or goggles 700A. The augmented reality glasses and/or goggles 700A include, among other components, a camera 702, a display 704, one or more input devices 706, one or more memory devices 708, and a processor 710 coupled to and/or in communication with one another via a bus 712, similar to the camera 102, display 104, input device(s) 106, memory device(s) 108, processor 110, and bus 112 discussed with reference to the digital headset 100A illustrated in and discussed with reference to FIG. 1A.

14

Figure 8:
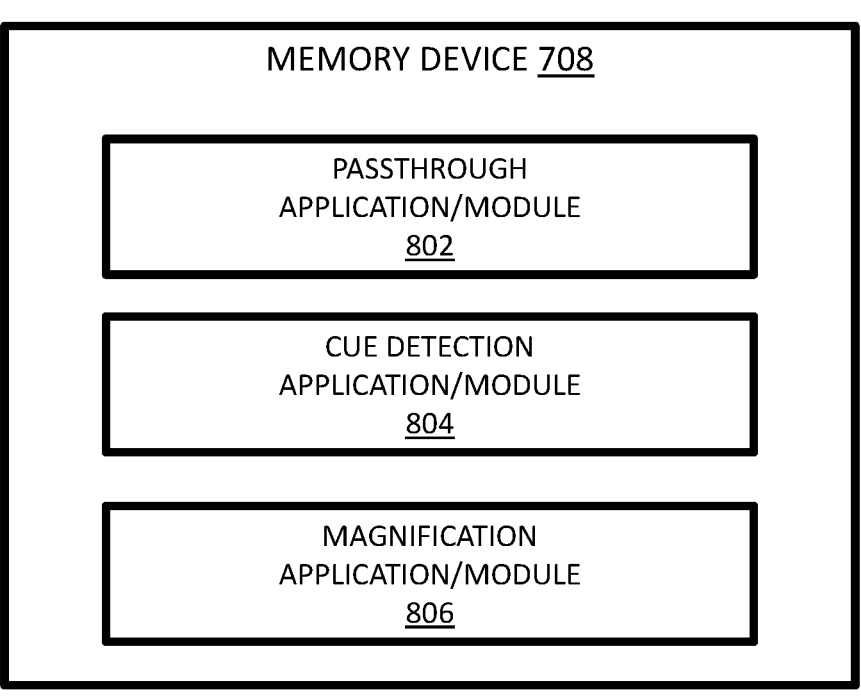
FIG. 8 is schematic block diagram of one embodiment of a memory device included in the AR glasses/AR goggles of FIGS. 7A and 7B.

Referring to FIG. 8, FIG. 8 is a schematic block diagram of one embodiment of a storage device 708. At least in the illustrated embodiment, the storage device 708 includes, among other components, a passthrough application and/or module 802, a cue detection application and/or module 804, and a magnification application and/or module 806 similar to the passthrough application and/or module 202, a cue detection application and/or module 204, and a magnification application and/or module 206 stored on the storage device(s) 108 discussed with reference to FIG. 2.

Figure 9:
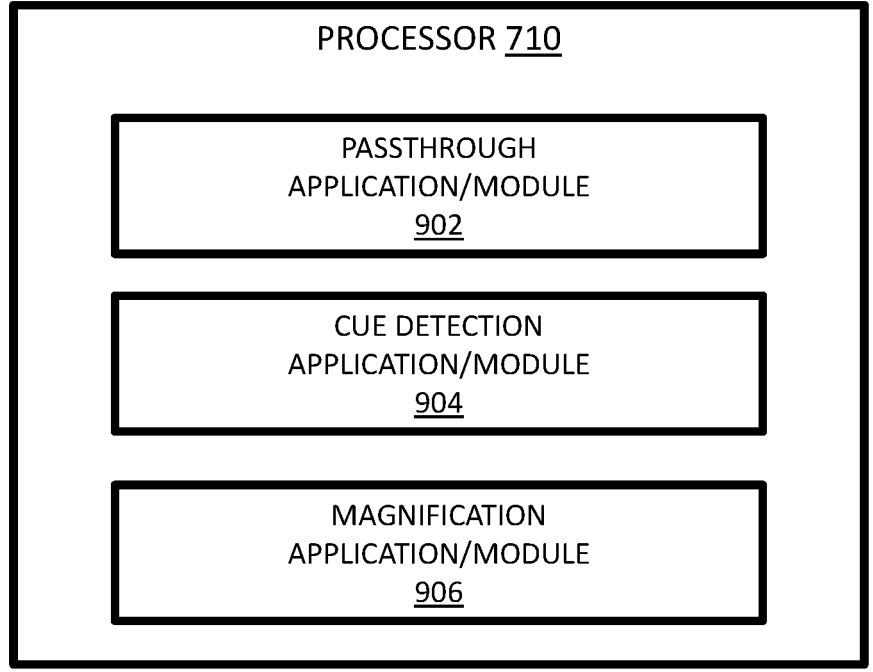
FIG. 9 is schematic block diagram of one embodiment of a processor included in the AR glasses/AR goggles of FIGS. 7A and 7B.

With reference to FIG. 9, FIG. 9 is a schematic block diagram of one embodiment of a processor 710. At least in the illustrated embodiment, the processor 710 includes, among other components, a passthrough application and/or module 902, a cue detection application and/or module 904, and a magnification application and/or module 906 similar to the passthrough application and/or module 302, a cue detection application and/or module 304, and a magnification application and/or module 306 stored on the processor 110 discussed with reference to FIG. 3. As such, the passthrough application and/or module 802/902, cue detection application and/or module 804/904, and magnification application and/or module 806/906 executed by the processor 710 can be stored on and executed from a memory device 708 and/or from the processor 710.

Figure 7B:
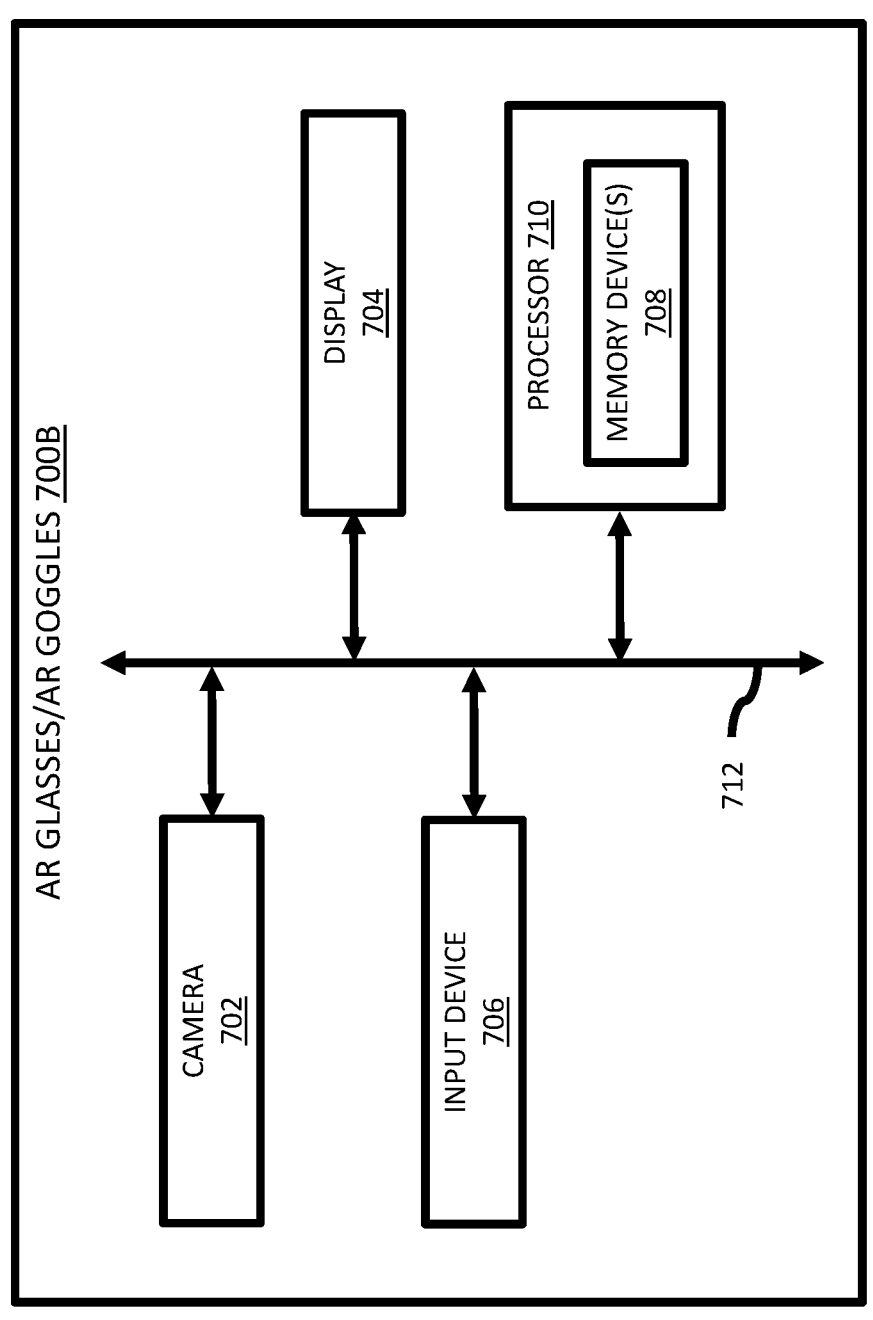

With reference to FIG. 7B, FIG. 7B is a block diagram of another embodiment of augmented reality glasses and/or goggles 700B. The augmented reality glasses and/or goggles 700B include, among other components, a camera 702, a display 704, one or more input devices 706, one or more memory devices 708, and a processor 710 coupled to and/or in communication with one another via a bus 712, similar to the camera 102, display 104, input device(s) 106, memory device(s) 108, processor 110, and bus 112 discussed with reference to the digital headset 100A illustrated in and discussed with reference to FIG. 1A. Alternative to the augmented reality glasses/goggles 700A, the processor 410 in the augmented reality glasses/goggles 700B includes the memory device(s) 708 as opposed to the memory device(s) 708 of the augmented reality glasses/goggles 700A being a different device than and/or independent of the processor 710.

Figure 10A:
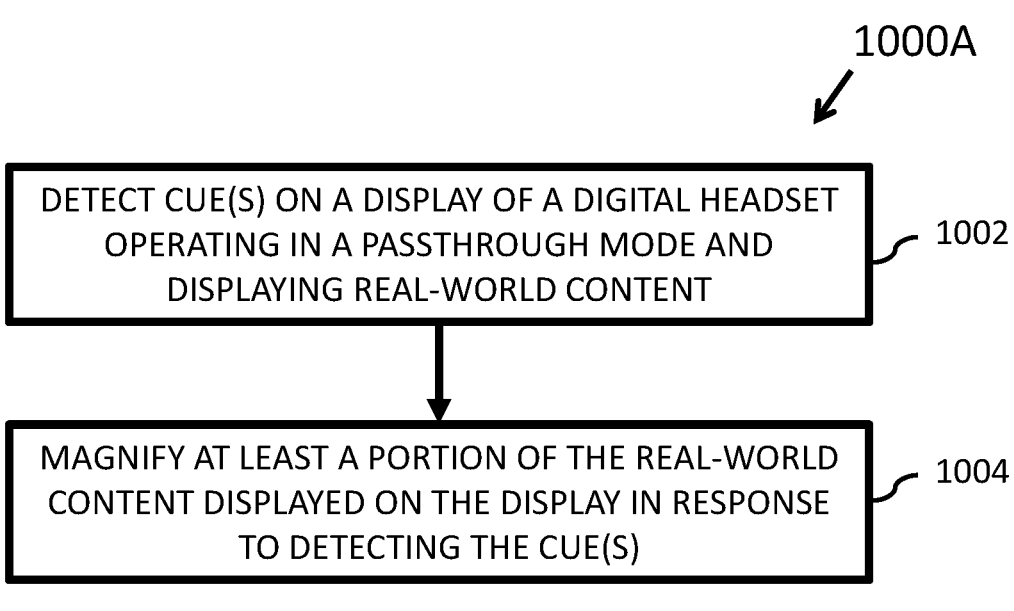
FIGS. 10A and 10B are schematic flow chart diagrams illustrating various embodiments of a method that can automatically magnify real-world content displayed on a digital headset operating in passthrough mode.

Referring to FIG. 10A, FIG. 10A is a schematic flow chart diagram illustrating one embodiment of a method 1000A that can automatically magnify real-world content displayed on a digital headset (e.g., digital headset 100A, 100B) operating in passthrough mode. At least in the illustrated embodiment, the method 1000A can begin by a processor (e.g., processor 110) detecting on or more cues (e.g., visual cues) on a display (e.g., display 104) of the digital headset 100A, 100B operating in passthrough mode and displaying real-world content (block 1002).

The visual cue(s) may include any embodiment of the visual cue(s) discussed elsewhere herein. Further, the visual cue(s) may be detected using any detection and/or identification method and/or technique discussed elsewhere herein.

The method 1000A further includes the processor 108 magnifying at least a portion of the real-world content displayed on the display 104 in response to detecting the visual cue(s) (block 1004). The real-world content may include any embodiment of real-world content discussed elsewhere herein. For example, the real-world content may include one or more analog objects, analog data/material, one or more digital objects, and/or digital data/material, as discussed elsewhere herein.

The amount and/or magnitude that the portion of the real-world content is magnified may include amount/magnitude of magnification discussed elsewhere herein. Further, the portion may be magnified using any method and/or technique of magnification discussed elsewhere herein.

Figure 10B:
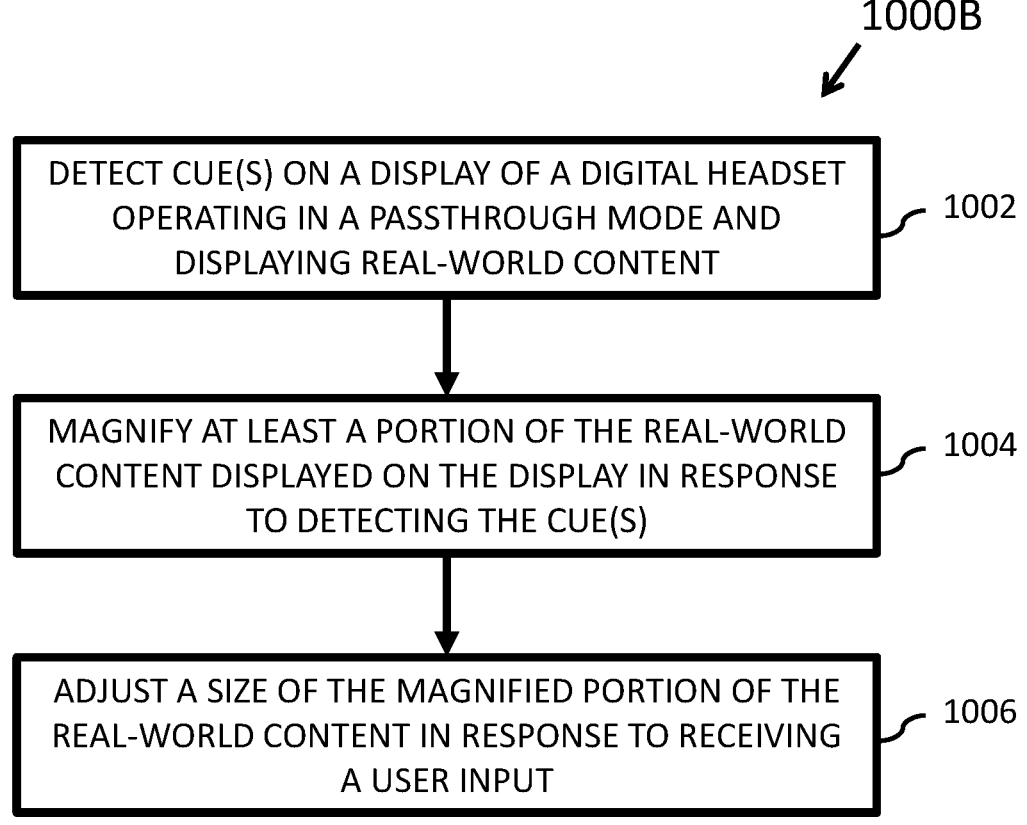

With reference to FIG. 10B, FIG. 10B is a schematic flow chart diagram illustrating another embodiment of a method 1000B that can automatically magnify real-world content displayed on a digital headset (e.g., digital headset 100A, 100B) operating in passthrough mode. At least in the illustrated embodiment, the method 1000B can begin by a processor (e.g., processor 110) detecting on or more cues (e.g., visual cues) on a display (e.g., display 104) of the digital headset 100A, 100B operating in passthrough mode and displaying real-world content (block 1002).

The visual cue(s) may include any embodiment of the visual cue(s) discussed elsewhere herein. Further, the visual cue(s) may be detected using any detection and/or identification method and/or technique discussed elsewhere herein.

The method 1000B further includes the processor 108 magnifying at least a portion of the real-world content displayed on the display 104 in response to detecting the visual cue(s) (block 1004). The real-world content may include any embodiment of real-world content discussed elsewhere herein. For example, the real-world content may include one or more analog objects, analog data/material, one or more digital objects, and/or digital data/material, as discussed elsewhere herein.

The amount and/or magnitude that the portion of the real-world content is magnified may include amount/magnitude of magnification discussed elsewhere herein. Further, the portion may be magnified using any method and/or technique of magnification discussed elsewhere herein.

In addition, the method 1000B includes adjusting a size of the magnified portion of the real-world content in response to receiving a user input (block 1006). The size may be adjusted to any suitable size and/or reduced to its original size, as discussed elsewhere herein.

Figure 11A:
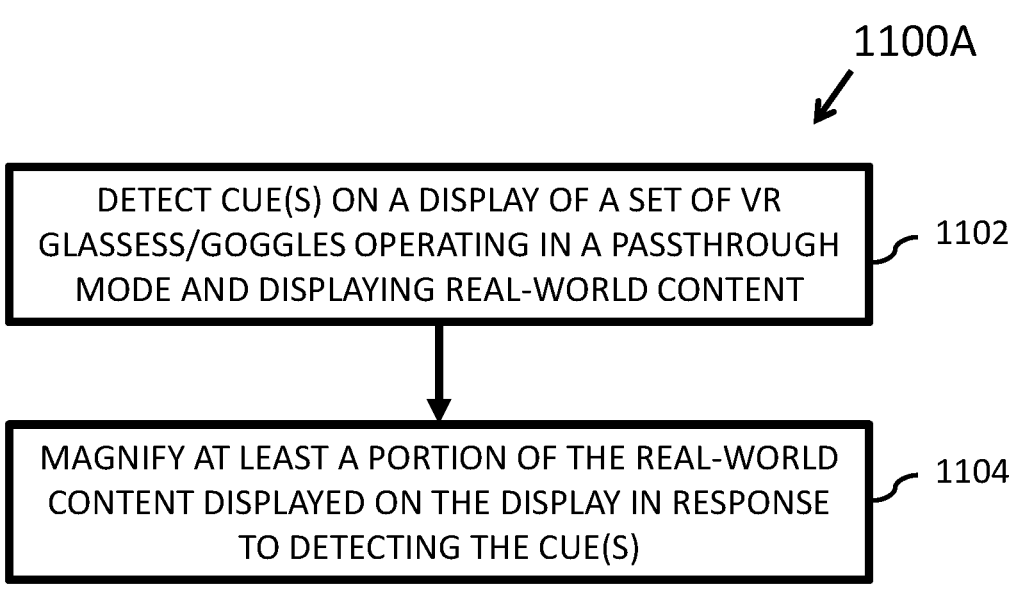
FIGS. 11A and 11B are schematic flow chart diagrams illustrating various embodiments of a method that can automatically magnify real-world content displayed on a set of VR glasses/VR goggles operating in passthrough mode.

Referring to FIG. 11A, FIG. 11A is a schematic flow chart diagram illustrating one embodiment of a method 1100A that can automatically magnify real-world content displayed on a set of VR glasses and/or VR goggles (e.g., VR glasses/VR goggles 400A, 400B) operating in passthrough mode. At least in the illustrated embodiment, the method 1100A can begin by a processor (e.g., processor 410) detecting on or more cues (e.g., visual cues) on a display (e.g., display 404) of the VR glasses and/or VR goggles 400A, 400B operating in passthrough mode and displaying real-world content (block 1102).

The visual cue(s) may include any embodiment of the visual cue(s) discussed elsewhere herein. Further, the visual cue(s) may be detected using any detection and/or identification method and/or technique discussed elsewhere herein.

The method 1100A further includes the processor 108 magnifying at least a portion of the real-world content displayed on the display 104 in response to detecting the visual cue(s) (block 1104). The real-world content may include any embodiment of real-world content discussed elsewhere herein. For example, the real-world content may include one or more analog objects, analog data/material, one or more digital objects, and/or digital data/material, as discussed elsewhere herein.

The amount and/or magnitude that the portion of the real-world content is magnified may include amount/magnitude of magnification discussed elsewhere herein. Further, the portion may be magnified using any method and/or technique of magnification discussed elsewhere herein.

Figure 11B:
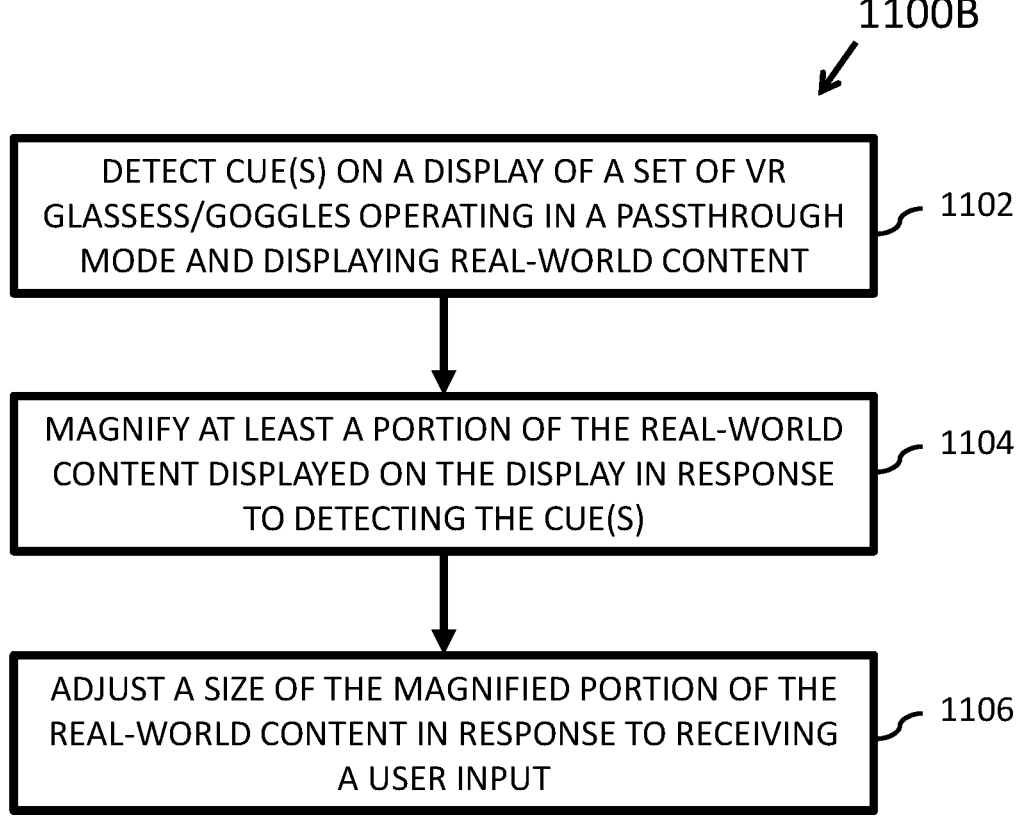

With reference to FIG. 11B, FIG. 11B is a schematic flow chart diagram illustrating another embodiment of a method 1100B that can automatically magnify real-world content displayed on a set of VR glasses and/or VR goggles (e.g., VR glasses and/or VR goggles 400A, 400B) operating in passthrough mode. At least in the illustrated embodiment, the method 1100B can begin by a processor (e.g., processor 410) detecting on or more cues (e.g., visual cues) on a display (e.g., display 404) of the VR glasses and/or VR goggles 400A, 400B operating in passthrough mode and displaying real-world content (block 1102).

The visual cue(s) may include any embodiment of the visual cue(s) discussed elsewhere herein. Further, the visual cue(s) may be detected using any detection and/or identification method and/or technique discussed elsewhere herein.

The method 1100B further includes the processor 408 magnifying at least a portion of the real-world content displayed on the display 404 in response to detecting the visual cue(s) (block 1104). The real-world content may include any embodiment of real-world content discussed elsewhere herein. For example, the real-world content may include one or more analog objects, analog data/material, one or more digital objects, and/or digital data/material, as discussed elsewhere herein.

The amount and/or magnitude that the portion of the real-world content is magnified may include amount/magnitude of magnification discussed elsewhere herein. Further, the portion may be magnified using any method and/or technique of magnification discussed elsewhere herein.

In addition, the method 1100B includes adjusting a size of the magnified portion of the real-world content in response to receiving a user input (block 1106). The size may be adjusted to any suitable size and/or reduced to its original size, as discussed elsewhere herein.

Figure 12A:
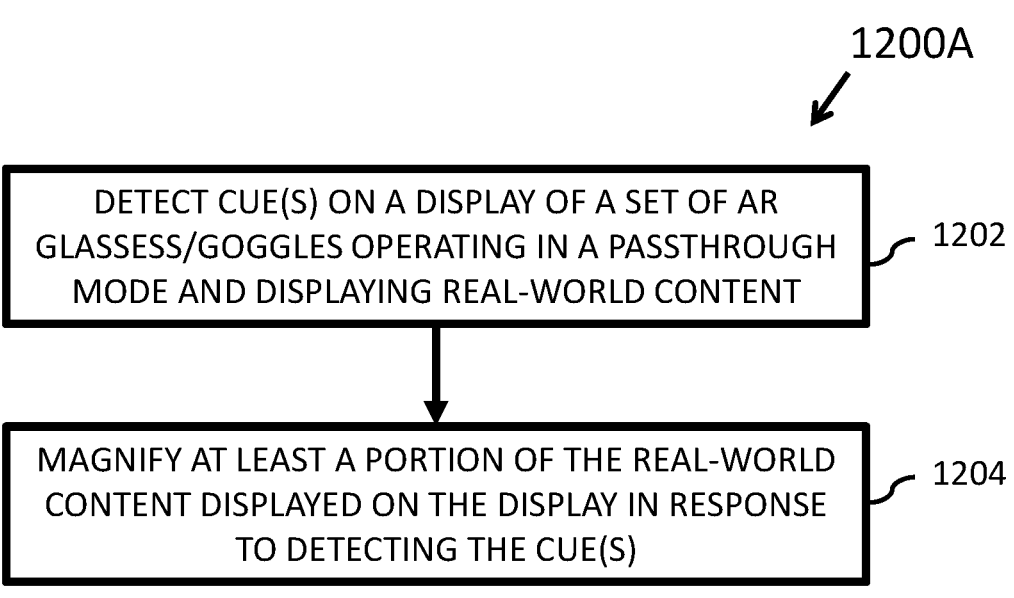
FIGS. 12A and 12B are schematic flow chart diagrams illustrating various embodiments of a method that can automatically magnify real-world content displayed on a set of AR glasses/AR goggles operating in passthrough mode.

Referring to FIG. 12A, FIG. 12A is a schematic flow chart diagram illustrating one embodiment of a method 1200A that can automatically magnify real-world content displayed on a set of AR glasses and/or AR goggles (e.g., AR glasses/AR goggles 700A, 700B) operating in passthrough mode. At least in the illustrated embodiment, the method 1200A can begin by a processor (e.g., processor 710) detecting on or more cues (e.g., visual cues) on a display (e.g., display 704) of the AR glasses and/or AR goggles 700A, 700B operating in passthrough mode and displaying real-world content (block 1202).

The visual cue(s) may include any embodiment of the visual cue(s) discussed elsewhere herein. Further, the visual cue(s) may be detected using any detection and/or identification method and/or technique discussed elsewhere herein.

The method 1200A further includes the processor 108 magnifying at least a portion of the real-world content displayed on the display 104 in response to detecting the visual cue(s) (block 1204). The real-world content may include any embodiment of real-world content discussed elsewhere herein. For example, the real-world content may include one or more analog objects, analog data/material, one or more digital objects, and/or digital data/material, as discussed elsewhere herein.

The amount and/or magnitude that the portion of the real-world content is magnified may include amount/magnitude of magnification discussed elsewhere herein. Further, the portion may be magnified using any method and/or technique of magnification discussed elsewhere herein.

Figure 12B:
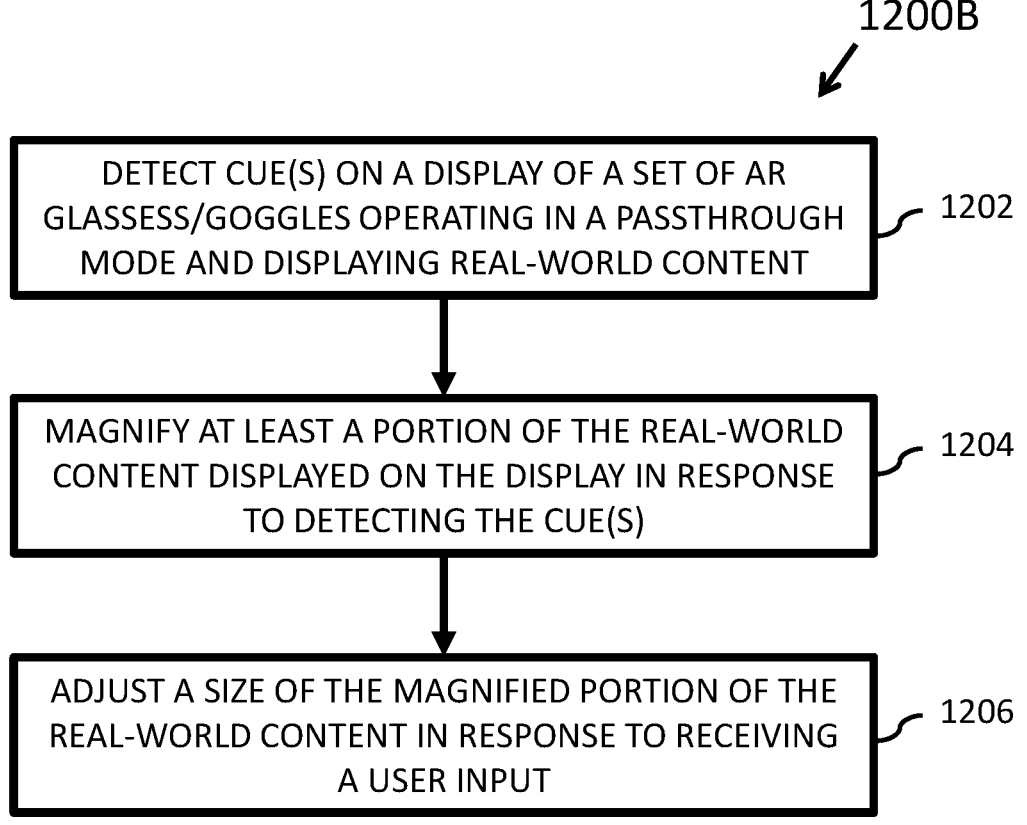

With reference to FIG. 12B, FIG. 12B is a schematic flow chart diagram illustrating another embodiment of a method 1200B that can automatically magnify real-world content displayed on a set of AR glasses and/or AR goggles (e.g., AR glasses and/or AR goggles 700A, 700B) operating in passthrough mode. At least in the illustrated embodiment, the method 1200B can begin by a processor (e.g., processor 710) detecting on or more cues (e.g., visual cues) on a display (e.g., display 704) of the AR glasses and/or AR goggles 700A, 700B operating in passthrough mode and displaying real-world content (block 1102).

The visual cue(s) may include any embodiment of the visual cue(s) discussed elsewhere herein. Further, the visual cue(s) may be detected using any detection and/or identification method and/or technique discussed elsewhere herein.

The method 1200B further includes the processor 708 magnifying at least a portion of the real-world content displayed on the display 704 in response to detecting the visual cue(s) (block 1204). The real-world content may include any embodiment of real-world content discussed elsewhere herein. For example, the real-world content may include one or more analog objects, analog data/material, one or more digital objects, and/or digital data/material, as discussed elsewhere herein.

The amount and/or magnitude that the portion of the real-world content is magnified may include amount/magnitude of magnification discussed elsewhere herein. Further, the portion may be magnified using any method and/or technique of magnification discussed elsewhere herein.

In addition, the method 1200B includes adjusting a size of the magnified portion of the real-world content in response to receiving a user input (block 1206). The size may be adjusted to any suitable size and/or reduced to its original size, as discussed elsewhere herein.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor; and
a memory coupled to the processor, the memory comprising instructions executable by the processor to cause the apparatus to:
display, on a first display of a digital headset operating in a passthrough mode, a real-world environment surrounding the digital headset;
detect on the first display one or more visual cues corresponding to a real-world personal computing device present in the real-world environment that is currently being displayed on the first display;
identify the real-world personal computing device present in the real-world environment based on correlating the detected one or more visual cues and the real-world personal computing device, wherein:
the identified real-world personal computing device is known to include a second display displaying real-world content thereon, and
the real-world content comprises one of digital data, digital information, or digital data and digital information, and
automatically magnify at least a portion of the real-world content that is currently being displayed on the second display in response to detecting and identifying the real-world personal computing device,
wherein the personal computing device comprises one of a laptop computer, a desktop computer, a hand-held computer, a smart phone, a cellular telephone, a smart watch, smart television, or a personal digital assistant.

2. The apparatus of claim 1, wherein the digital headset comprises one of a set of virtual reality (VR) glasses or VR goggles.

3. The apparatus of claim 1, wherein the digital headset comprises one of a set of augmented reality (AR) glasses or AR goggles.

4. The apparatus of claim 1, wherein the digital content data comprises digital text.

5. The apparatus of claim 1, further comprising an external facing camera coupled to the processor and configured to detect the one or more visual cues corresponding to the real-world personal computing device present in the real-world environment that is currently being displayed on the first display.

6. The apparatus of claim 1, wherein the one or more visual cues for identifying the real-world personal computing device and corresponding to the real-world personal computing device present in the real-world environment that is currently being displayed on the first display comprise one or more of a shape of the personal computing device, digital text, a digital image, digital print, and a glow of the second display.

7. The apparatus of claim 1, wherein:
the one or more visual cues that are currently displayed on the first display for identifying the real-world personal computing device comprise a human body part proximate to the real-world personal computing device.

8. The apparatus of claim 7, wherein the human body part comprises a set of one or more human fingers.

9. A method, comprising:
displaying, by a processor on a first display of a digital headset operating in a passthrough mode, a real-world environment surrounding the digital headset;
detecting on the first display, by the processor, one or more visual cues corresponding to a real-world personal computing device present in the real-world environment that is currently being displayed on the first display;
identifying the real-world personal computing device present in the real-world environment based on correlating the detected one or more visual cues and the real-world personal computing device, wherein:
the identified real-world personal computing device includes a second display displaying real-world content thereon, and
the real-world content comprises one of digital data, digital information, or digital data and digital information; and
in response to detecting and identifying the real-world personal computing device, automatically magnifying at least a portion of the real-world content that is currently being displayed on the second display,
wherein the personal computing device comprises one of a laptop computer, a desktop computer, a hand-held computer, a smart phone, a cellular telephone, a smart watch, smart television, or a personal digital assistant.

10. The method of claim 9, wherein the digital data comprises digital text.

11. The method of claim 9, wherein the one or more visual cues for identifying the real-world personal computing device and corresponding to the real-world personal computing devices present in the real-world environment that is currently being displayed on the first display comprise one or more of a shape of the personal computing device, digital text, a digital image, digital print, and a glow of the second display.

12. The method of claim 9, wherein:

the one or more visual cues corresponding to the real-world personal computing device present in the real-world environment that is currently being displayed on the first display comprise a human body part proximate to the real-world personal computing device.

13. The method of claim 12, wherein the human body part comprises a set of one or more human fingers.

14. The method of claim 9, wherein the digital headset comprises one of a set of virtual reality (VR) glasses or VR goggles.

15. The method of claim 9, wherein the digital headset comprises one of a set of augmented reality (AR) glasses or AR goggles.

16. A non-transitory computer program product comprising a computer-readable storage device including code embodied therewith, the code executable by a processor to cause the processor to:

display, on a first display of a digital headset operating in a passthrough mode, a real-world environment surrounding the digital headset;

detect on the first display one or more visual cues corresponding to a real-world personal computing device present in the real-world environment that is currently being displayed on the first display;

identifying the real-world personal computing device present in the real-world environment based on correlating the detected one or more visual cues and the real-world personal computing device, wherein:

the identified real-world personal computing device is known to include a second display displaying real-world content thereon, and the real-world content comprises one of digital data, digital information, or digital data and digital information; and automatically magnify at least a portion of the real-world content that is currently being displayed on the second display in response to detecting and identifying the real-world personal computing device, wherein the personal computing device comprises one of a laptop computer, a desktop computer, a hand-held computer, a smart phone, a cellular telephone, a smart watch, smart television, or a personal digital assistant.

17. The computer program product of claim 16, wherein the one or more visual cues for identifying the real-world personal computing device and corresponding to the real-world personal computing devices present in the real-world environment that is currently being displayed on the first display comprise one or more of a shape of the personal computing device, digital text, a digital image, digital print, and a glow of the second display.

18. The computer program product of claim 16, wherein the one or more visual cues corresponding to the real-world personal computing device present in the real-world environment that is currently being displayed on the first display comprise a human body part proximate to the real-world personal computing device.

19. The computer program product of claim 18, wherein the human body part comprises a set of one or more human fingers.

20. The computer program product of claim 16, wherein the digital headset comprises one of a set of virtual reality (VR) glasses, VR goggles, augmented reality (AR) glasses, or AR goggles.

* * * * *